(No Model.)

S. W. CHALLEN.
MACHINE FOR FINISHING CAST HOLLOW WARE.

No. 546,044. Patented Sept. 10, 1895.

Witnesses
H. van Oldenneel
E. A. Scott

Inventor
Stephen William Challen
by
Attorneys

UNITED STATES PATENT OFFICE.

STEPHEN WILLIAM CHALLEN, OF BIRMINGHAM, ENGLAND.

MACHINE FOR FINISHING CAST HOLLOW WARE.

SPECIFICATION forming part of Letters Patent No. 546,044, dated September 10, 1895.

Application filed May 21, 1895. Serial No. 550,031. (No model.) Patented in England January 25, 1893, No. 1,619.

*To all whom it may concern:*

Be it known that I, STEPHEN WILLIAM CHALLEN, a citizen of Great Britain, residing at Birmingham, in the county of Warwick, England, have invented certain new and useful Improvements in Machinery for Finishing Cast Hollow Ware, (for which I received a patent in Great Britain January 25, 1893, No. 1,619;) and I do hereby declare the following to be a full, clear, and exact description of the invention, such as will enable others skilled in the art to which it appertains to make and use the same.

My invention relates to the manner in which I construct and arrange machinery for turning or finishing the interior of saucepans or other cast hollow ware by the expenditure of less labor and time and by a simpler and more effective process than that in ordinary and common practice.

The object of my invention is to construct and arrange a machine that shall be capable of producing a fine smooth surface upon the cylindrical and bottom interior surfaces of the saucepan or other cast hollow ware in one operation, leaving the surface ready to be tinned without the necessity of polishing or in any way improving the surface.

Figure 3:
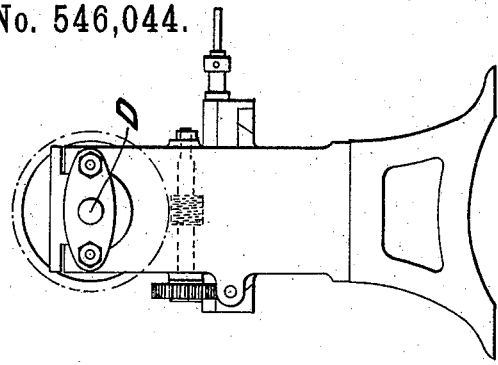
Figure 5:
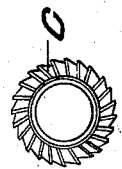
Figure 6:
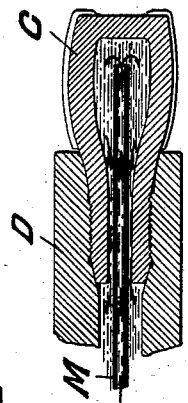
Figure 4:
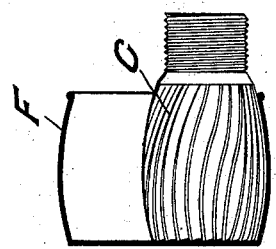
Figure 1:
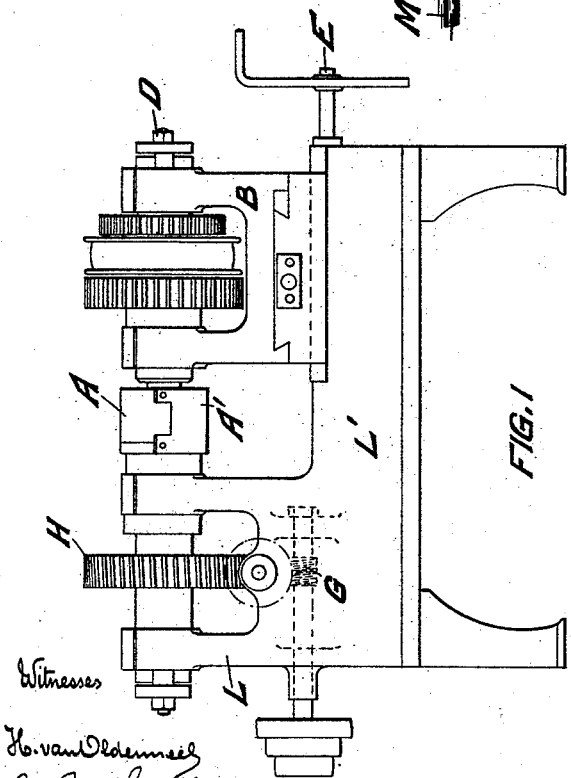
Figure 2:
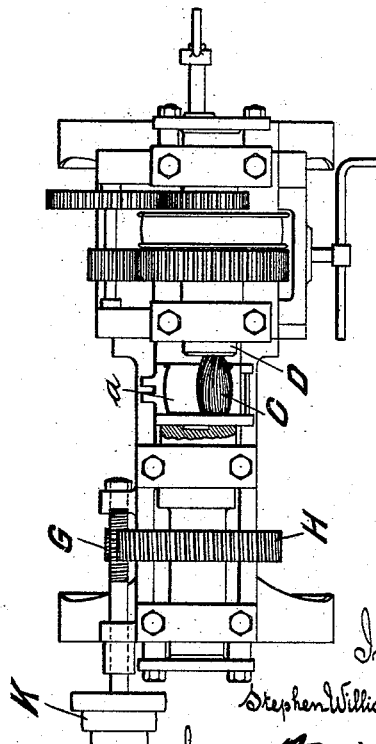

In the accompanying sheet of explanatory drawings, Figure 1 is a front elevation of a lathe which I employ in connection with my improvements. Fig. 2 is a plan and Fig. 3 an end elevation of the same. Fig. 4 is an enlarged sectional plan of a saucepan with the cutting-tool in position, and Fig. 5 is an end elevation or view of the face of the cutter. Fig. 6 illustrates the method of cooling the milling-cutter during working by the circulation of water in the interior of the same.

In carrying my invention into effect I mount a strong spindle between bearings on the head-stock of the lathe driven directly by gearing and by belt and pulley, and upon this spindle I mount a chuck or holder A, in which I provide a circular recess $a$, having the shape and configuration of the exterior of the saucepan or other vessel which I wish to operate upon. I preferably arrange the holder A in two halves or segments, the one half A' hinged to the other half A on one side, and on the other side I arrange a hinged screw and nut for clipping these two segments together, and so firmly securing the saucepan or other vessel within the recess formed in the chuck or holder to receive it. Upon the opposite side of the lathe bed or frame I mount a head-stock B, capable of adjustment in a direction parallel to and at right angles to the length of the bed. A milling-cutter C is screwed or otherwise securely fastened to the overhanging end of a rotating spindle D, mounted in the bearings of this head-stock B and driven at the proper surface speed by toothed wheels and cone-pulleys in the ordinary manner, and this rotating cutter is capable of being introduced into the interior of the vessel to be operated upon by the action of a screw E, lever, or rack and pinion in any well-known manner. The diameter of the cylindrical milling-cutter C, I make equal to about one-half the diameter of the interior bottom of the vessel, such as F, and its length is equal to that of the interior depth of the vessel, and has its cylindrical surface and end surface cut for action upon the cylindrical interior and upon the bottom interior surfaces, respectively, of the vessel. In the case of a milling-tool for operating upon a saucepan a curve or taper from the middle to each end of the milling-tool is required, in order that the necessary curvilinear contour shall be given to the interior of the saucepan. The milling-tool operates simultaneously upon a line extending from the center of the bottom of the saucepan or vessel to the largest diameter of the bottom, and thence along the barrel or other shaped wall of the vessel to the rim, so that when the saucepan has been caused to revolve once the whole of its interior surface has been milled.

The action of the machine is as follows: The saucepan or other similar vessel F is placed within the chuck-holder A A' and firmly secured in position, and the chuck together with the saucepan are caused to rotate slowly by pulleys and worm or other ordinary mechanical gearing, such as G H K. The milling-cutter C, which is caused to rotate at a proper speed, is then introduced within the interior of the vessel and is caused to bear upon the the interior cylindrical surface and upon the bottom interior surface thereof, and as the vessel is slowly rotated the entire surface of the interior is milled after one revolution of the saucepan, leaving a fine smooth surface, which does not require finishing or polishing prior to the subsequent process of tinning. More than one revolution of the vessel may be made, if desired, to impart extra finish; but with a proper feed or "pinch" and a proper milling-tool I find that the surface is sufficiently finished at one revolution of the saucepan or other vessel. I preferably cast the head-stock L, carrying the spindle on which the chuck or holder is mounted, in one with the lathe bed or frame L', thereby obtaining greater rigidity of construction.

I do not limit myself to the particular method hereinbefore described of "chucking" the vessel to be operated upon, but employ any other equivalent and suitable method of securing the vessel to the chuck.

To cool the milling-cutter C during working, I hollow out its interior and cause a stream of water to be circulated through it, preferably in the manner shown at Fig. 6. The cutter C is then provided with a conical or tapered inner end, in order that when screwed into the spindle D it shall be pressed tightly against the conical interior surface of the spindle to form a water-tight joint. The water is admitted through the small internal pipe M and returns along the annular space between the exterior of the pipe and the interior surface of the milling-cutter C.

Having thus described my invention, what I claim, and desire to secure by Letters Patent, is—

In a machine for finishing cast hollow ware, the combination with the chuck holder carried upon a slowly revolving spindle, of the hollow spindle D, the hollow cutter C having a tapered shank threaded into said spindle, and an enlarged head and the pipe M extending axially through the spindle and into the hollow cutter for supplying cooling liquid thereto, substantially as described.

In witness whereof I have hereunto set my hand in presence of two witnesses.

STEPHEN WILLIAM CHALLEN.

Witnesses:
HERBERT BOWKETT,
EDGAR W. HULME.